United States Patent Office 2,908,685
Patented Oct. 13, 1959

2,908,685

PREPARATION OF VAT DYESTUFFS

Albert Bloom, Summit, and Dennis Leslie Deutsch, Cranford, N.J., assignors to General Aniline & Film Corporation, New York, N.Y., a corporation of Delaware No Drawing. Application February 1, 1957
Serial No. 637,637

2 Claims. (Cl. 260—282)

This invention relates to vat dyestuffs and relates more particularly to the preparation of nitrogen-containing vat dyestuffs of the naphthoylene diarylimidazole series.

United States Patents Nos. Re. 18,643, 1,690,775, 1,765,661, 1,765,662, 1,889,279, 1,924,090, 1,928,719 and 1,935,945 describe the preparation of vat dyestuffs by condensing the dianhydride of 1,4,5,8-naphthalene tetra carboxylic acid, or the acid itself, with an ortho-diamine or an ortho-nitroamine, or the salts thereof, in the presence or absence of a solvent or diluent. The products obtained in accordance with the procedures taught in these patents are not of uniform constitution and are, in fact, mixtures of isomeric dyestuffs. Thus, as described in U.S. Patent No. Re. 18,643, for instance, when condensing 1,4,5,8-naphthalene tetra carboxylic acid with ortho-phenylenediamine, a mixture of two isomeric dyestuffs of the following formulae is obtained:

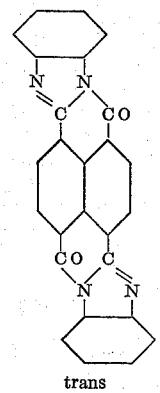

trans and

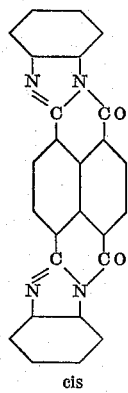

cis

When condensing a substituted ortho-phenylenediamine with 1,4,5,8-naphthalene tetra carboxylic acid the same holds true, i.e. there is also obtained a mixture of the cis- and trans-isomers.

Heretofore, the mixture of isomeric dyestuffs were separated into its cis- and trans-components by any suitable process, many of which have been described in the patented art. Thus, in U.S. Patent No. 1,888,624, there is described a separation into its components of such a dyestuff mixture by dissolving the dyestuff mixture in concentrated sulfuric acid and causing the dissolved dyestuffs to fractionally crystallize from the sulfuric acid solution either by diluting or cooling the said sulfuric acid solution. In U.S. Patents Nos. 1,888,625 and 1,888,626, the separation is effected by the use of chloroacetic acid; in U.S. Patent No. 1,927,928 by the use of alcoholic alkali metal hydroxide; in U.S. Patent No. 1,952,661, toluene sulfonic acid is employed; in U.S. Patent No. 2,011,807, a solution of aluminum chloride in nitrobenzene is used; while in U.S. Patent No. 2,073,098 either sodium amide or sodium ethylate is applied to complete the separation. Of the products obtained from the original mixture of the cis-isomer and the trans-isomer, the trans-isomer is the more valuable one. Thus, more specifically, when 1,4,5,8-naphthalene tetra carboxylic acid is condensed with ortho-phenylenediamine, according to U.S. Patent No. Re. 18,643, and the mixture separated into its two isomeric components, in accordance with the process set forth in U.S. Patent No. 1,927,928, wherein toluene sulfonic acid is employed in the process of separating the two components, there is obtained the trans-isomer which dyes cotton in orange shades and is characterized by having excellent fastness properties, and the cis-isomer which has poor wash fastness, characteristic of all cis-isomers. The light fastness of the cis-isomer is fair but the dyeings bleed strongly after washing. Accordingly, the cis-isomer was considered commercially unacceptable.

We have now made the surprising discovery that by halogenating, i.e. by chlorinating or brominating, heretofore valueless cis-isomers of original mixtures of isomeric dyestuffs, very satisfactory dyestuffs with excellent fastness properties can be obtained. Thus, in the case of the substantially commercially valueless cis-isomer obtained from the mixture of isomers, prepared in accordance with Patent No. Re. 18,643, for example, by chlorinating or brominating the cis-isomer a very valuable dyestuff is obtained. The shade of this latter dyestuff is shifted towards the blue and, depending upon the amount of chlorine or bromine introduced into the molecule, desirable shades of red-browns are obtainable. This behavior of the cis-isomer was rather unexpected since the chlorine-containing compound of the formula:

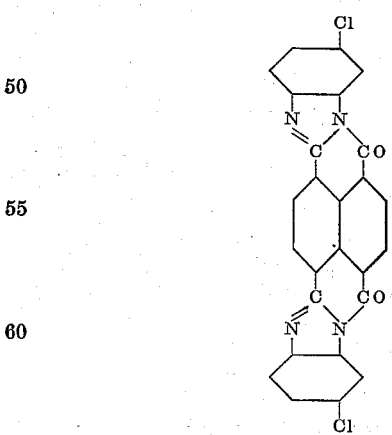

as obtained by condensing 1,4,5,8-naphthalene tetra carboxylic acid with 4-chloro-o-phenylenediamine, and subsequent separation of this compound from a mixture thereof with its trans-isomer by any of the known methods, has very poor washing fastness, and is not more valuable than the cis-isomer referred to above which is obtained in accordance with the process of U.S. Patent No. Re. 18,643, i.e. one having no halogen in the molecule. We have found that by halogenating, i.e. chlorinating or brominating, the cis-isomer obtained in accordance with the process of U.S. Patent No. Re. 18,643, wherein 1,4,5,8-naphthalene tetra carboxylic acid is condensed with ortho-phenylenediamine and the mixture separated into its components, the properties of the new dyestuffs obtained from the cis-isomer are entirely different and very much improved, making for a very valuable dyestuff.

The exact positions into which the halogens are introduced in the cis-isomer is not certain, but due to the entirely different behavior of the halogenated cis-isomer prepared in accordance with our invention, it is believed that the halogens are not in the benzene ring or, if they are in the benzene ring, the halogens are not in the same positions as they would have been when introduced before the condensation.

The following examples are given for the purpose of illustrating our invention and are not to be considered in any way limitative. The parts are by weight.

Example I 82.4 grams (0.2 m.) of the cis-isomer obtained by condensing a 1,4,5,8-naphthalene tetra carboxylic acid with ortho-phenylenediamine and 95.4 grams (0.9 m.) of anhydrous sodium carbonate are suspended in 600 cc. of nitrobenzene. To this mixture is added in succession at 40 to 45° C. 1.5 grams of iodine and during a period of 3 hours 144 grams (0.9 m.) of bromine diluted with 200 cc. of nitrobenzene. Agitation is continued for 5 hours at 40 to 45° C., the temperature then is raised at a rate of 10° C. per hour to 80° C., held for 10 hours at 80° C., cooled to 50° C. and filtered. The filter cake is washed 3 times with 50 cc. of nitrobenzene, sucked dry and steam distilled, filtered, washed with water and dried. The reaction product contains 25.9% of bromine and dyes cotton in a red-brown shade of excellent all round fastness. The yield is 94%.

Example II 36 grams of bromine were slowly added at 40 to 45° C. to a mixture of 250 cc. of nitrobenzene, 20.6 grams of the cis-isomer obtained by condensing a 1,4,5,8-naphthalene tetra carboxylic acid with ortho-phenylenediamine and 0.2 gram of iodine. The reaction was agitated for 10 hours at 60° C., then slowly raised 100° C., held at 100° C. for 5 hours, cooled to 50° C. and filtered. The filter cake washed 3 times with nitrobenzene and sucked dry. The filter cake was freed from nitrobenzene by steam distillation and the bromination product filtered, washed with water and dried. The reaction product contains 15.6% of bromine and dyes cotton in a red-brown shade of good fastness properties.

Example III

Same as Example I, except that 82.4 grams of the cis-isomer obtained by condensing a 1,4,5,8-naphthalene tetra carboxylic acid with ortho-phenylenediamine were treated with only 72 grams (0.45 m.) of bromine in presence of 47.7 grams (0.45 m.) of anhydrous sodium carbonate. The resulting product, after working it up the usual way, has a bromine content of 22.5% and dyes cotton in a less bluer shade than the product prepared according to Example I. The wash fastness is excellent with no bleeding.

Example IV 20.6 grams of the cis-isomer obtained by condensing a 1,4,5,8-naphthalene tetra carboxylic acid with ortho-phenylenediamine were suspended in 200 grams of nitrobenzene together with 1.0 gram of iodine. To this mixture was added at 80 to 90° C. slowly 37.0 grams of chlorine gas. Thereafter the suspension was steam distilled until free of nitrobenzene, filtered, washed with water and dried. The yield is 23.0 grams and the products contain 16.1% of chlorine. After acid pasting from 10 parts of 96% sulfuric acid it dyes cotton in a red-brown shade and shows excellent chlorine and wash fastness.

Example V 41.2 grams of the cis-isomer obtained by condensing a 1,4,5,8-naphthalene tetra carboxylic acid with ortho-phenylenediamine and 0.4 gram of antimony trisulfide were suspended in 500 grams of nitrobenzene and heated to 80° C. Chlorine gas (66.0 grams) together with some $SO_2$-gas was now introduced between 80° C. and 120° C. and kept at the end at 120° C. for 1 hour. After a steam distillation, filtration and drying 43.0 grams of a product was obtained which had a chlorine content of 14.9% and dyed cotton in bluish red-brown shade. Its fastness properties (wash, chlorine and bleeding) were excellent and comparable with the best products on the market dyeing cotton in red-brown shades.

Example VI

The same procedure was followed as in Example V but instead of nitrobenzene, 500.0 grams of trichlorobenzene was used as a solvent and 250 grams of chlorine gas was introduced into the suspension together with some $SO_2$-gas. After working up the reaction product by the usual method, 36 grams of a dyestuff were obtained which dyed cotton in red-brown shades and had very good wash fastness properties. The chlorine content of the product was 14.3% after acid pasting from 10 parts of sulfuric acid 96%.

Example VII 20.6 grams of the cis-isomer obtained by condensing a 1,4,5,8-naphthalene tetra carboxylic acid with ortho-phenylene-diamine, 0.1 gram of iodine were suspended in 200 grams of nitrobenzene and at 20° C. a mixture of 91.0 grams of sulfuryl chloride and 91.0 grams of nitrobenzene was added in 1½ hours. The temperature rose to 33° C. during this addition; and was heated to 60° C. in ½ hour and kept at 60° C. for ½ hour. Finally, the mixture was heated to 100° C. in 1 hour and kept at 100° C. for 1 hour. After steam distillation, filtration and washing 20.8 grams of a product was obtained, which had a chlorine content of 13.0%. After the usual acid pasting a red-brown dye was obtained which showed exceptional qualities in the chlorine, wash fastness and bleeding tests.

Example VIII

The procedure outlined in Example IV was followed and the product was isolated in the usual way. After acid pasting the wet filter cake was resludged in 1000 grams of water and treated with 50 cc. of a sodium hypochlorite solution at 90 to 95° C. The addition of sodium hypochloride was continued until there was an excess noticeable (test on starch-iodine paper) for 15 minutes. A total of 125 cc. were consumed. After cooling to 25° C. and filtering off the reaction product a dyestuff was obtained which dyed cotton in much brighter shades than the untreated product described in Example IV and had also superior wash fastness properties.

Example IX

The red-brown dyestuff obtained in Example VI was treated in an aqueous suspension with 100 cc. of sodium hypochloride at 90 to 95° C. The resulting dyestuff dyes cotton in brighter shades than the untreated product and has also superior wash fastness. The wash fastness, however, was still slightly inferior to the products obtained in Examples I, II or III, having bromine introduced into the molecule, rather than chlorine.

Example X 36 grams of bromine were slowly added at 40 to 45° C. to a mixture of 250 cc. of nitrobenzene, 20.6 grams of the cis-isomer obtained by condensing a 1,4,5,8-naphthalene tetra carboxylic acid with chloro-ortho-phenylenediamine and 0.2 gram of iodine. The reaction was agitated for 10 hours at 60° C., then slowly raised to 100° C., held at 100° C. for 5 hours, cooled to 50° C. and filtered. The filter cake washed 3 times with nitrobenzene and sucked dry. The filter cake was freed from nitrobenzene by steam distillation and the bromination product filtered, washed with water and dried. The reaction product contains 19.2% of bromine and dyes cotton in a red-brown shade of good fastness properties.

*Example XI*

36 grams of bromine were slowly added at 40 to 45° C. to a mixture of 250 cc. of nitrobenzene, 20.6 grams of the cis-isomer obtained by condensing a 1,4,5,8-naphthalene tetra carboxylic acid with tolylene diamine and 0.2 gram of iodine. The reaction was agitated for 10 hours at 60° C., then slowly raised to 100° C., held at 100° C. for 5 hours, cooled to 50° C. and filtered. The filter cake washed 3 times with nitrobenzene and sucked dry. The filter cake was freed from nitrobenzene by steam distillation and the bromination product filtered, washed with water and dried. The reaction product contains 19.2% of bromine and dyes cotton in a red-brown shade of good fastness properties.

From the foregoing, it will be seen that our invention is highly advantageous, in that we have succeeded in preparing valuable dyestuffs or pigments having excellent fastness properties and pleasing shades from heretofore valueless products. In addition, our invention has economical advantages, too, since until now the trans-isomer with good to excellent fastness properties as a dyestuff or pigment could not be marketed due to the high cost of manufacture. With little value on the cis-isomer, the entire manufacturing cost had to be absorbed by the trans-isomer and this high cost deprived the product from a widespread use. By upgrading the cis-isomer, as in accordance with our invention, we have prepared two highly satisfactory products so that the cost of manufacture can be divided equally between the two isomers, making the whole process commercially profitable.

It is to be understood that the foregoing detailed description is merely given by way of illustration and that many variations may be made therein without departing from the spirit of our invention.

Having described our invention, what we desire to secure by Letters Patent is:

1. Process for the preparation of vat dyestuffs of the naphthoylene diarylimidazol series, which comprises separating the isomeric dyestuff mixture obtained by condensing a 1,4,5,8-naphthalene tetra carboxylic acid with a phenylenediamine selected from the group consisting of ortho-phenylenediamine, chloro-ortho-phenylenediamine and toluylene diamine into its trans-isomer and cis-isomer components, and chlorinating the cis-isomer free from the trans-isomer.

2. Process for the preparation of vat dyestuffs of the naphthoylene diarylimidazol series, which comprises separating the isomeric dyestuff mixture obtained by condensing a 1,4,5,8-naphthalene tetra carboxylic acid with a phenylenediamine selected from the group consisting of ortho-phenylenediamine, chloro-ortho-phenylenediamine and toluylene diamine into its trans-isomer and cis-isomer components, and brominating the cis-isomer free from the trans-isomer.

References Cited in the file of this patent

UNITED STATES PATENTS

| | | |
|---|---|---|
| 1,588,451 | Eckert et al. | June 15, 1926 |
| 1,888,626 | Eckert et al. | Nov. 22, 1932 |
| 1,928,719 | Eckert et al. | Oct. 3, 1933 |
| 2,073,098 | Eckert et al. | Mar. 9, 1937 |

FOREIGN PATENTS

| | | |
|---|---|---|
| 534,493 | Germany | Oct. 5, 1931 |